United States Patent
Bosnjakovic et al.

(10) Patent No.: US 11,875,240 B1
(45) Date of Patent: Jan. 16, 2024

(54) TUNING A GENERATIVE ARTIFICIAL INTELLIGENCE MODEL

(71) Applicant: Intuit Inc., Mountain View, CA (US)

(72) Inventors: Dusan Bosnjakovic, Los Angeles, CA (US); Anshuman Sahu, Los Gatos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/225,985

(22) Filed: Jul. 25, 2023

(51) Int. Cl.
*G06N 20/00* (2019.01)
*G06N 5/04* (2023.01)
*G06F 40/40* (2020.01)

(52) U.S. Cl.
CPC ............. *G06N 20/00* (2019.01); *G06F 40/40* (2020.01); *G06N 5/04* (2013.01)

(58) Field of Classification Search
CPC ........... G06N 20/00; G06N 5/04; G06F 40/40
See application file for complete search history.

(56) References Cited

U.S. PATENT DOCUMENTS

| | | | | |
|---|---|---|---|---|
| 2012/0329032 | A1* | 12/2012 | Fan | G06F 16/334 434/362 |
| 2019/0362402 | A1* | 11/2019 | Oh | G06F 40/284 |
| 2021/0157857 | A1* | 5/2021 | Nogueira Dos Santos | G06N 20/00 |
| 2023/0009946 | A1* | 1/2023 | Rossiello | G06F 40/216 |

OTHER PUBLICATIONS

Lamichhane et al.; Keyphrase Detection and Question Generation From Text Using Machine Learning; DSpace at Tribhuvan University Center Library (TUCL)/Report/Engineering/Computer Engineering, Apr. 30, 2023. (Year: 2023).*

* cited by examiner

*Primary Examiner* — Abul K Azad
(74) *Attorney, Agent, or Firm* — Paradice & Li LLP

(57) ABSTRACT

Systems and methods are disclosed for tuning a generative artificial intelligence (AI) model based on a knowledge base. Instead of manually generating questions relevant to the knowledge base, providing those questions to the generative AI model, and manually reviewing the answers generated by the generative AI model in order to tune the generative AI model over many iterations, a natural language processing model may be configured to leverage the knowledge base to automatically generate questions and answers based on the knowledge base. In this manner, the natural language processing model is able to generate tuning data that may be used to automatically tune the generative AI model. The systems and methods also disclose automatic tuning of the generative AI model, including testing and feedback that may be used to improve tuning of the generative AI model.

20 Claims, 5 Drawing Sheets

TUNING A GENERATIVE ARTIFICIAL INTELLIGENCE MODEL

TECHNICAL FIELD

This disclosure relates generally to the management of generative artificial intelligence models, including the tuning of a generative artificial intelligence model for use.

DESCRIPTION OF RELATED ART

A generative artificial intelligence (AI) model is a model that is trained to generate content based on prompts to the model. One popular generative AI model is ChatGPT® from OpenAI®. The ChatGPT model receives a user input requesting a text output from the model, and the ChatGPT model generates and outputs text based on the user input. While ChatGPT is one example generative AI model, various other generative AI models exist and are in development, such as InstructGPT, GPT-4, Google® Bard, and so on. Such generative AI models may be referred to as a question and answer model, where the model is provided a natural language question and the model generates a natural language answer to the question.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Systems and methods are disclosed for tuning a generative artificial intelligence (AI) model based on a specific knowledge base. Instead of manually generating questions relevant to the knowledge base, providing those questions to the generative AI model, and manually reviewing the answers generated by the generative AI model in order to tune the generative AI model over many iterations, a natural language processing model may be configured to leverage the knowledge base to automatically generate questions and answers based on the knowledge base. In this manner, the natural language processing model is able to generate tuning data that may be used to automatically tune the generative AI model. The systems and methods also disclose automatic tuning of the generative AI model, including testing and feedback that may be used to improve tuning of the generative AI model.

One innovative aspect of the subject matter described in this disclosure can be implemented as a computer-implemented method for tuning a generative artificial intelligence (AI) model. The method includes, for each article of one or more articles stored in a knowledge base: retrieving the article from the knowledge base; receiving, by a natural language processing (NLP) model, the article retrieved from the knowledge base; generating, by the NLP model, a question based on the article; generating, by the NLP model, an answer based on the question, wherein the question and the answer are together a question answer pair; receiving the question by a content retrieval model; retrieving, by the content retrieval model, a second article from the knowledge base based on the question, wherein the second article is linked to the question answer pair; and storing the question answer pair and the linked second article as a data point in a tuning data set. The method also includes tuning a pretrained generative AI model using the tuning data set.

Another innovative aspect of the subject matter described in this disclosure can be implemented in a system for tuning a generative AI model. An example system includes a knowledge base, one or more processors, and a memory storing instructions that, when executed by the one or more processors, cause the system to perform operations. The operations include, for each article of one or more articles stored in a knowledge base: retrieving the article from the knowledge base; receiving, by an NLP model, the article retrieved from the knowledge base; generating, by the NLP model, a question based on the article; generating, by the NLP model, an answer based on the question, wherein the question and the answer are together a question answer pair; receiving the question by a content retrieval model; retrieving, by the content retrieval model, a second article from the knowledge base based on the question, wherein the second article is linked to the question answer pair; and storing the question answer pair and the linked second article as a data point in a tuning data set. The operations also include tuning a pretrained generative AI model using the tuning data set.

In some implementations, tuning the pretrained generative AI model includes, for each article of the one or more articles stored in the knowledge base, providing the question and the second article as inputs to the pretrained generative AI model, generating a second answer by the pretrained generative AI model based on the question and the second article; and generating a cost based on comparing the answer and the second answer. Tuning the pretrained generative AI model further includes tuning the pretrained generative AI model to reduce the one or more costs.

In some implementations, tuning the pretrained generative AI model includes, for each article of the one or more articles stored in the knowledge base, providing the question and the second article as inputs to the pretrained generative AI model and generating a second answer by the pretrained generative AI model based on the question and the second article. Tuning the pretrained AI model further includes providing one of the one or more second answers to one or more users, receiving user feedback from the one or more users regarding the second answer, and tuning the pretrained generative AI model based on the user feedback. The user feedback may include feedback regarding one or more of an accuracy of the second answer, a completeness of the second answer, or an appropriateness of the second answer.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
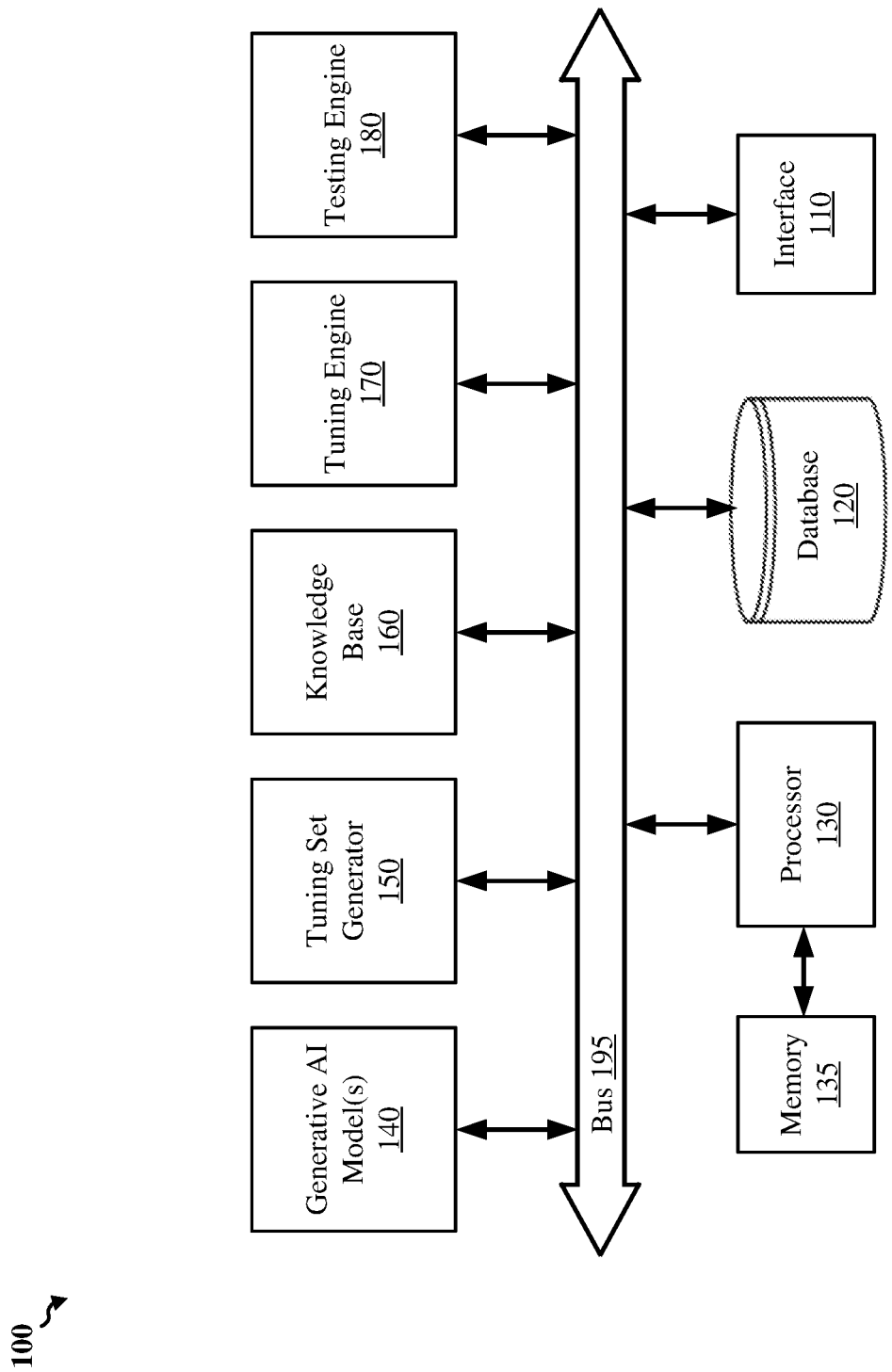
FIG. 1 shows an example system for tuning a generative artificial intelligence (AI) model, according to some implementations.

Implementations of the subject matter described in this disclosure may be used for tuning a generative artificial intelligence (AI) model. The generative AI models referred to herein are a generative AI model configured to generate a natural language answer to a question provided to the model.

Various generative AI models that generate natural language answers are trained on a large corpus of data. For example, many generative pre-trained transformer (GPT) models (such as GPT3) are trained on publicly available data (such as via the internet) that spans decades. Other generative AI models that are trained include the Text-To-Text Transfer Transformer (T5) model, the bidirectional autoregressive transformer (BART) model, and the Pathways Language Model 2 (PaLM 2) model. The generative AI models are considered trained for general use, but there may be a need to tune a pretrained generative AI model for a specific domain or subject matter. For example, if a research facility wants to use a generative AI model to answer questions regarding, e.g., ecology and environmental sciences, the research facility may desire a pretrained generative AI model to be tuned to be more of a subject matter expert on such fields.

Typical fine-tuning (which is also referred to herein as "tuning") of a pretrained generative AI model includes manually generating a plethora of questions and desired answers to those questions focusing on a desired domain. Tuning thus involves iteratively providing the questions to the generative AI model, receiving the answers generated by the AI model, comparing the generated answers to the desired answers, and adjusting one or more hyperparameters of the generative AI model to attempt to improve subsequent answers generated by the generative AI model for those questions. Hyperparameters include the weights of the model that may be adjusted.

A problem with typical tuning of a pretrained generative AI model is the generation of the tuning set (including the questions and desired answers) used to tune the pretrained generative AI model. Manually generating a sufficient number of questions and answers can take weeks or months (or even longer). In addition, ensuring that the sets of questions and answers create a well-rounded tuning set (thus sufficiently covering enough topics for tuning) requires expert knowledge prone to human error, especially as the number of questions in the tuning set increases. As such, there is a need for quickly generating a well-rounded tuning set.

An additional problem with typical tuning of a pretrained generative AI model is that the tuning process is configured for a specific generative AI model. Therefore, if a different generative AI model is to be tuned, a completely new tuning process would need to be configured for the different generative AI model. As such, there is also a need for making the tuning process flexible for use for any of a plurality of generative AI models to more efficiently tune the desired model.

Another problem with typical tuning of a pretrained generative AI model is that the outputs from the generative AI model are typically manually reviewed by a dedicated expert (or dedicated team of experts) who must be vetted to ensure that their subject matter expertise is acceptable. Requiring a dedicated team of vetted experts to review the outputs may delay the tuning process, or the experts may be unaware of what output is desired by an actual user from the model. As such, there is a need for a testing framework that efficiently tests the outputs of the model without requiring a specific expert or team of experts.

Various implementations of the subject matter disclosed herein provide one or more technical solutions to tuning generative AI models. As described herein, a system is configured to automatically generate the tuning set for tuning a generative AI model. The system may also be configured to automatically tune the generative AI model, with the system being configurable for training any of a host of generative AI models. The system may be further configured to automatically test the generative AI model without requiring a dedicated tester or a dedicated team of testers.

Various aspects of the present disclosure provide a unique computing solution to a unique computing problem that did not exist prior to the creation of machine learning models, and in particular generative AI models. The tuning and use of machine learning technology (including generative AI) as described herein cannot be performed in the human mind, much less practically in the human mind, including the use of pen and paper. As such, implementations of the subject matter disclosed herein are not an abstract idea such as organizing human activity or a mental process that can be performed in the human mind.

Websites and applications may have an integrated digital assistant that a user may use to look up an answer to a question that the user may have. Most digital assistants are rule based that rely on rules, intents, and writer content programmed by developers. For example, Intuit® Quickbooks includes a digital assistant, which appears as a window in the program. A user can type in a question or topic into an input window of the digital assistant, and the digital assistant obtains and provides to the user articles retrieved from Intuit's knowledge base based on the words or phrases in the question or topic.

As used herein, a knowledge base refers to a storage of digital content that may be accessed to answer various user questions or may otherwise include institutional knowledge. The content is referred to as including articles. Articles may include text from previously written web pages on various topics (such as help pages), or previously written answers (such as by client support or by a user community) to previously asked questions from users (such as from client support records or from user community records stored on one or more servers). For example, Intuit has a knowledge base for Quickbooks that includes articles specific to Quickbooks (such as how to use the product) or specific to topics related to Quickbooks (such as finance or accounting topics).

Typically, once a user provides a query (referred to herein as a question) to the digital assistant, a content retrieval model is configured to identify the most relevant articles from the knowledge base and retrieve those articles from the knowledge base so that they may be provided to the user via the digital assistant. For example, the digital assistant may generate links (such as Uniform Resource Links) to the different relevant articles hosted and accessible (such as via the internet), and provide the links to the user. To identify the most relevant articles, the content retrieval model analyzes the terms in the user's question to identify articles including the same terms. The content retrieval model may also analyze other factors, such as usability of articles (such as ranking pages based on frequency of user access), expertise level of the article writer (such as whether the article is from client support or a community member), user location, and so on. The content retrieval model may be programmed the same as an internet search engine, except instead of searching the internet, the content retrieval model searches the knowledge base.

A digital assistant that provides the articles (such as links to articles) to users leads to a large portion of users escalating their questions from the digital assistant to live support. As such, there is a push to improve existing digital assistants to provide natural language answers to natural language questions. In this manner, the digital assistant acts as an AI chatbot instead of just an article retrieval tool in order to reduce the reliance on live support or even reducing the amount of reading the user must perform to answer the question (thus reducing the amount of user time needed to answer the question and improving the user experience).

An AI chatbot digital assistant is based on a question answer type generative AI model that provides natural language answers to natural language questions. Various natural language generative AI models are in use today, including ChatGPT, GPT3, or other GPT based models, the T5 model, and the bidirectional autoregressive transformer (BART) model. At Intuit, the Foundational Intuit Language Model (FILM) is a generative AI model that may be used. Generative AI models are pretrained on a large corpus of data (such as internet data in the English language if the model is to answer questions in the English language). For a pretrained generative AI model to be used as a digital assistant for a specific topic or product (such as for the Intuit Quickbooks application), the generative AI model is tuned to focus the model on the specific topic or product.

Described herein are systems and processes for tuning a pretrained generative AI model. As described herein, tuning includes generating the tuning set (which may also be referred to as a training set) to tune the model. Tuning may also include or be associated with testing the model, as described herein. The application of such a tuned generative AI model is for a digital assistant, but the model may be used for other applications. For clarity, the following examples are described as regarding a digital assistant for a product (such as Intuit Quickbooks).

FIG. 1 shows an example system 100 for tuning a generative AI model, according to some implementations. The system 100 includes an interface 110, a database 120, a processor 130, a memory 135 coupled to the processor 130, a tuning set generator 150, a knowledge base 160, and a tuning engine 170. In some implementations, the system 100 may also include one or more generative AI models 140 and the testing engine 180. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (I/O) interfaces to obtain inputs to one or more generative AI models, provide outputs from one or more generative AI models, provide test results to one or more testers, obtain feedback from one or more testers, or receive or provide inputs or outputs for continued operation of the system 100. An example interface may include a wired interface or wireless interface to the internet or other means to communicably couple with other devices. In some implementations, the interface 110 may include an interface with an ethernet cable or a wireless interface to a modem, which is used to communicate with an internet service provider (ISP) directing traffic to and from other devices (such as a system used by a developer, tester, or other types of users to use the system 100 for a generative AI model 140). For example, pretrained generative AI model 140 may be tuned by the system 100, and a tester may interface with the system 100 in order to test the generative AI model, or a user may interface with the system 100 in order to use the generative AI model. The system 100 may use the interface 110 to provide a prompt of a digital assistant based on the generative AI model to a user (which may also refer below to a tester or developer for clarity) to provide question to be provided to the generative AI model 140. If the generative AI model 140 is being tested, access to the system 100 to interact with a digital assistant for a tester may be in a digital sandbox of the testing engine 180. In this manner, the model 140 may be tested, with feedback given via the interface 110. If the system 100 is local to a user (such as to an internal developer), the interface 110 may include a display, a speaker, a mouse, a keyboard, or other suitable input or output elements that allow interfacing with the user (such as to provide a prompt to receive previously generated questions to the generative AI model, receive questions from the user, provide outputs from the generative AI model, provide other information for tuning the generative AI model, receive feedback from the user, and so on).

The database 120 may store questions to the generative AI model, answers from the generative AI model, articles retrieved from the knowledge base 160 for questions to the generative AI model, the tuning set to tune the generative AI model, hyperparameters of the generative AI model, or other computer executable instructions or data for operation of the system 100. In some implementations, the database 120 may include a relational database capable of presenting information as data sets in tabular form and capable of manipulating the data sets using relational operators. For example, if the database 120 stores the tuning set to tune the generative AI model, question answer pairs and the linked articles of the tuning set may be organized in tabular form. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, any of the one or more generative AI models 140, the tuning set generator 150, the tuning engine 170, and the testing engine 180. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, any of the one or more generative AI models 140, the tuning set generator 150, the tuning engine 170, and the testing engine 180 that may be executed by the processor 130. The memory 135 may also store inputs, outputs, or other information associated with the components 140-180 of the system 100 or any other data for operation of the system 100.

The generative AI model(s) 140 include one or more models to be tuned by the system 100. In some implementations, the system 100 includes one pretrained generative AI model 140 that is to be trained by the system 100. For example, a developer may load a pretrained generative AI model (referred to herein simply as a generative AI model), to the system 100 via the interface 110, and the system 100 stores the generative AI model for tuning. In some other implementations, the system 100 may include a repository storing a plurality of generative AI models. In this manner, to tune a generative AI model, the system 100 selects one of the plurality of generative AI models in the repository and retrieves the selected generative AI model from the repository for tuning. Selection may be based on the generative AI models being sorted in order of preference. For example, a developer may provide a list of the order of preference of the models, with the list stored on the system 100, and the processor 130 executing instructions to retrieve the generative AI model from the repository may access the list and retrieve the models in order of priority. In some implementations, more than one generative AI model may be retrieved for tuning. For example, multiple generative AI models may be retrieved and tuned to compare the outputs and select the most suitable model for use based on the comparison. Which models to retrieve and the sequence in retrieving the models may be based on the order of preference in the list.

The repository may be any suitable storage of the system 100. For example, the repository may be the database 120, the memory 135, or another memory coupled to the processor 130. The generative AI models 140 included in the repository may include one or more of the BART model, the T5 model, one or more GPT based models (such as GPT3), or the FILM model. In some implementations, if only one generative AI model 140 is included in the system 100, the generative AI model is the BART model or the T5 model. To note, if a repository is able to store a plurality of generative AI models, models may be added to the repository at any time. For example, when a new generative AI model that is able to be tuned becomes available, the new generative AI model is provided to the repository. The list may also be updated, such as to include the newest generative AI model first in preferences for tuning so that the new model may be compared to other generative AI models. Storing a generative AI model may include storing the model itself or storing instructions for accessing an application programming interface (API) of the model (which may be stored on a different system). For example, the system 100 may store instructions for accessing the generative AI model for tuning (including how to provide tuning inputs to the model), retrieving the outputs of the generative AI model, and adjusting various hyperparameters of the generative AI model during tuning.

The knowledge base 160 is, as noted above, a storage of digital content accessed to answer questions or otherwise store institutional knowledge. The knowledge base 160 stores articles as units of content that may be searched for and accessed. The knowledge base 160 includes content that is more focused on specific topics as compared to the general data used to pretrain the generative AI model. For example, an English language based generative AI model may be trained using a huge data set of English language webpages from across the internet. A company to use the generative AI model may wish for the model to be tuned to answer questions for a specific company product or for a specific topic. As such, the knowledge base 160 includes content tailored to the product or topic on which the model is to be tuned. As noted above, an example knowledge base that may be used by Intuit is for Intuit Quickbooks, with the content including articles specific to operation of Quickbooks or related to accounting or other related topics. The knowledge base 160 may be sourced to include any suitable content, such as historical digital data stored by an entity (such as from a community page or client support records from the company tuning the model for a product) or from an external message board dedicated to the entity (such as for a specific product for which the model is to be tuned). In some implementations, the knowledge base 160 is the storage of articles searchable by an existing digital assistant based on received queries (such as via an input window for a user or via an API to the digital assistant). For example, Intuit's digital assistant to search for, retrieve, and provide articles to a user based on a user query includes a content retrieval model that may be used to access the knowledge base 160. To note, the knowledge base 160 may be any suitable storage of the system 100. In some implementations, the knowledge base 160 is included in the database 120, with the articles of the knowledge base 160 being searchable and accessible. Through use of the knowledge base 160, the generative AI model 140 is grounded based on the knowledge base 160.

The tuning set generator 150 is to generate the tuning set to tune the generative AI model 140 based on the knowledge base 160. Typically, tuning sets are manually generated by developers and testers manually generating questions and manually generating answers to those questions. In tuning the generative AI model, the manually generated questions are used as inputs to the generative AI model, and the manually generated answers are used as labels for supervised learning. In this manner, the answers generated by the generative AI model can be compared to the manually generated answers, one or more hyperparameters of the generative AI model can be adjusted based on the comparison, and the manually generated questions can again be provided to the generative AI model, with the above steps being performed recursively in order to attempt to improve the generative AI model's answers to the manually generated questions. Manually generating questions and answers is an extremely labor intensive process and can be subject to human error. The tuning set generator 150 generates the tuning set in a manner that does not require manual generation of questions and answers. The tuning set generated by the tuning set generator 150 also includes additional information that the typical questions and answers to improve tuning (such as to reduce the amount of time and processing resources required to perform tuning).

To generate the tuning set, the tuning set generator 150 generates the questions based on the knowledge base 160, generates the answers to those questions based on the knowledge base 160, and also links articles from the knowledge base 160 related to the questions. The tuning set generated by the tuning set generator 150 thus includes one or more tuning data points (referred to simply as data points or tuning points). Each tuning data point includes a question answer pair generated by the tuning set generator 150 and an article from the knowledge base 160 linked to the question answer pair. In some implementations, the linked article for a question of a question answer pair of a tuning data point may be the article retrieved by the tuning set generator 150 in response to the question, such as described below with reference to FIGS. 2 and 3. For tuning using a tuning data point, a linked article and a question may be provided as input to the generative AI model 140 (with the linked article provided as additional information to help shape the model's answer), and the answer of the data point is used as a label for comparison to the model generated answer. Generating the tuning set is described in more detail below with reference to FIGS. 2 and 3.

The tuning engine 170 is to tune the generative AI model 140 using the tuning set generated by the tuning set generator 150. As noted above, the tuning set includes one or more data points, with each data point including a question, an answer, and a linked article from the knowledge base 160. In tuning the generative AI model 140, the question of each of the one or more data points is provided to the generative AI model 140 as an input prompting the generative AI model 140 to provide a response. The linked article for each question is also provided as an input to the generative AI model 140 for answering the input question to the generative AI model 140. As noted above (and described in more detail below), the linked article is the article retrieved by the tuning set generator 150 based on the data point question that is to be input to the generative AI model 140. As such, the article is provided as context for shaping the answer generated by the generative AI model. Providing the article to the generative AI model 140 may include providing a link to the article in the knowledge base (or another accessible location by the generative AI model 140) via an API of the generative AI model 140 or providing the text of the article directly to the generative AI model 140 via the API. The article may affect tokenization of the question performed by the generative AI model 140 or the portions of the knowledge base content to leverage by the generative AI model 140 to answer the question.

The generative AI model 140 generates a natural language answer based on the question and article of the data point, and the tuning engine 170 compares the natural language answer from the model to the answer in the data point. For example, a tokenizer of the tuning engine 170 may tokenize the two answers to generate two token strings, and the tuning engine 170 may compare the two token strings to generate a similarity score between the two token strings. Comparing the two token strings may be performed by vectorizing the token strings by a vectorizer of the tuning engine 170 to generate two numerical vectors and comparing the two numerical vectors (such as by computing a distance between the two vectors) to generate the similarity score (such as the distance between the two vectors). A loss or cost function to tune the generative AI model 140 may include a combination of the similarity scores generated by the tuning engine 170 across the one or more data points of the tuning set, and tuning the generative AI model 140 may include iteratively adjusting the hyperparameters of the model to reduce the loss function. As such, in some implementations of tuning a generative AI model 140, the tuning engine 170, for each of the one or more data points of the tuning set, generates a cost based on comparing the answer from the data point and the answer generated by the model 140, with tuning the model 140 including reducing the one or more costs.

In some implementations, each cost is associated with one or more objective testing metric values. As such, reducing the one or more costs includes improving the one or more object testing metric values. For example, the one or more objective testing metric values may be based on (such as include) one or more of a Bilingual Evaluation Understudy (BLEU) score or a Bidirectional Encoder Representations from Transformers (BERT) score (also referred to as a BERTscore). Improving a BLEU score or a BERT score includes increasing the BLEU score towards 1 (on a scale from 0 to 1) or increasing the BERT score towards 1 (on a scale from −1 to 1 or an adjusted scaled from 0 to 1) through iterative adjustments to the generative AI model 140 hyperparameters. Increasing the metric values refers to increasing the metric values in an overall manner (such as increasing an average, a sum, a median, or another combination of the BLEU scores across the data points). With a cost function, any suitable learning rate may be used for tuning, such as using the Adam optimization algorithm, which uses an adaptable learning rate. While the tuning engine 170 is described above as generating the costs (and cost function) between answers in order to tune the generative AI model 140, in some implementations, cost generation may additionally or alternatively be performed by the testing engine 180, which is described in more detail below.

In addition or alternative to tuning including adjusting the generative AI model 140 (such as the hyperparameters of the model), tuning may include adjusting the tuning data set used to tune the model. In some implementations, one or more questions or one or more answers generated for the tuning set by the tuning set generator may not be suitable for tuning. For example, a generated question may not be relevant to the article retrieved to generate the question, or the question may not be relevant to the product associated with the knowledge base 160. In another example, the answer generated by the tuning set generator 150 may be incorrect or not relevant to the product. As such, the cost between answers generated by the generative AI model 140 and answers of the tuning set may be used by the system 100 to identify data points that are not helpful in tuning the model 140. Additionally or alternatively, no matter the number of adjustments and iterations of adjustments to the generative AI model 140, the tuning engine 170 may be unable to increase the performance of the model for specific data points (such as the cost between answers remaining above a threshold). The system 100 may determine data points that remain outliers in terms of associated cost (such as being above a threshold after a defined number of iterations of tuning) and remove the data points from the tuning set. Alternatively, the questions and answers may be manually reviewed and adjusted to be more relevant for tuning.

In some implementations, the knowledge base 160 may be adjusted based on the outlier data points or otherwise for tuning. For example, the system 100 may compare the articles linked to the outlier data points to identify topics existing across the articles (such as key terms existing in each of the articles as identified by a natural language processor (NLP) model). If a topic of content in the knowledge base is consistently present in the articles of the outlier data points, the system 100 may remove the articles from the knowledge base 160, may prevent the articles from being loaded to the generative AI model 140 for tuning, or may prevent the tuning set generator 150 from accessing the articles to generate questions.

In some implementations of adjusting the tuning set, subjective metrics may be used to adjust the tuning set. For example, one or more experts may evaluate the answers generated by the model 140 to generate the subjective metrics. In some implementations, a tester is provided the model generated answer and the data point question. For example, the tester (which may be from a pool of testers accessing evaluating the model) may access a digital sandbox or playground implemented by the system 100. In the sandbox, a mimicking of an AI chatbot digital assistant may be presented to the tester, with the digital assistant displaying the question and the model generated answer. The system 100 then provides a request for feedback to the tester, with the tester providing feedback as one or more subjective metrics. In some implementations, the feedback includes feedback regarding one or more of the accuracy of the answer, the completeness of the answer, or the appropriateness of the answer. Feedback regarding the accuracy of the answer is to indicate how accurate the answer is in answering the question (e.g., does the answer suffer from hallucinations or incorrect information). Feedback regarding the completeness of the answer is to indicate how complete the answer is in answering questions (e.g., is there information missing that makes the answer unclear or otherwise incomplete). Feedback regarding the appropriateness of the answer is to indicate whether the answer conforms to societal norms (e.g., does the answer include profanity, toxic or contentious language, or disputable information such that the answer would not be appropriate for an end user).

In some implementations, the tester is requested to provide feedback in the form of a numerical value for each category. For example, the tester may be requested by the digital assistant in the sandbox to provide a score of 1, 2, or 3 (from 1 being the worst to 3 being the best) for each of the accuracy of the answer, the completeness of the answer, and the appropriateness of the answer. In some implementations, in addition to evaluating the model generated answer, the tester may also evaluate the data point answer used as a label in the tuning set for tuning. In this manner, the data point answer may also be evaluated for accuracy, completeness, and appropriateness. Similarly, the linked article may also be provided and evaluated with reference to the data point question.

Instead of requiring vetting of a tester to provide informative evaluations of the results, subjective testing by the system 100 may be based on crowd sourcing processes. In some implementations, a plurality of testers may provide feedback (such as scores from 1 to 3) for accuracy, completeness, and appropriateness. The testers may have varying levels of expertise or different areas of expertise. To generate an overall subjective metric for, e.g., accuracy of the answer, all of the accuracy scores across the testers may be combined. For example, the accuracy scores may be averaged to generate an average value from 1 to 3. The same may be performed for each of the completeness scores and appropriateness scores, too. These averages may then be used to train the generative AI model. For example, the subjective metrics may be included in the cost function for adjusting the hyperparameters of the generative AI model. In another example, the subjective metrics may be used by the system 100 to adjust the tuning set or the knowledge base (such as similar to using objective metrics). If the subjective metrics include feedback regarding questions in the tuning set, adjusting the tuning set may include removing one or more data points whose questions have subjective metrics less than one or more thresholds (such as an accuracy score less than an accuracy threshold, a completeness score less than a completeness threshold, or an appropriateness score less than an appropriateness threshold). Similar operations may also occur if the subjective metrics include feedback regarding one or more answers in the tuning set.

The testing engine 180 is to test the answers from the generative AI model 140. In some implementations, testing also includes testing the tuning set (such as the data point answers or data point questions). The testing performed by the testing engine 180 may be part of the tuning process or after the model is tuned. As such, while the tuning engine 170 and the testing engine 180 are depicted as separate components in FIG. 1, the tuning engine and the testing engine may be a single component. For example, the testing engine may generate the objective testing metrics or obtain the subjective testing metrics as described above. Those metrics may be obtained while training the generative AI model 140 (and thus used during training, such as to affect the adjustment of hyperparameters of the model or the adjustment of the tuning set) or after training the generative AI model 140 (such as to evaluate the outputs of the tuned model). The testing engine 180 is also described with reference to FIG. 5 below.

While the generative AI model(s) 140, the tuning set generator 150, the knowledge base 160, the tuning engine 170, and the testing engine 180 are depicted as separate components of the system 100 in FIG. 1 for clarity, the components 140-180 may be included in software including instructions stored in memory 135 or the database 120. In addition, components of the system 100 may be included in one device, distributed across multiple devices, may be included in fewer components, and so on. If the components are software, the components may be implemented using any suitable computer-readable language. For example, one or more of the models 140, the tuning set generator 150, the tuning engine 170, or the testing engine 180, and the configuration and interoperability of such components, may be programmed in the Python programming language using any suitable libraries.

Figure 2:
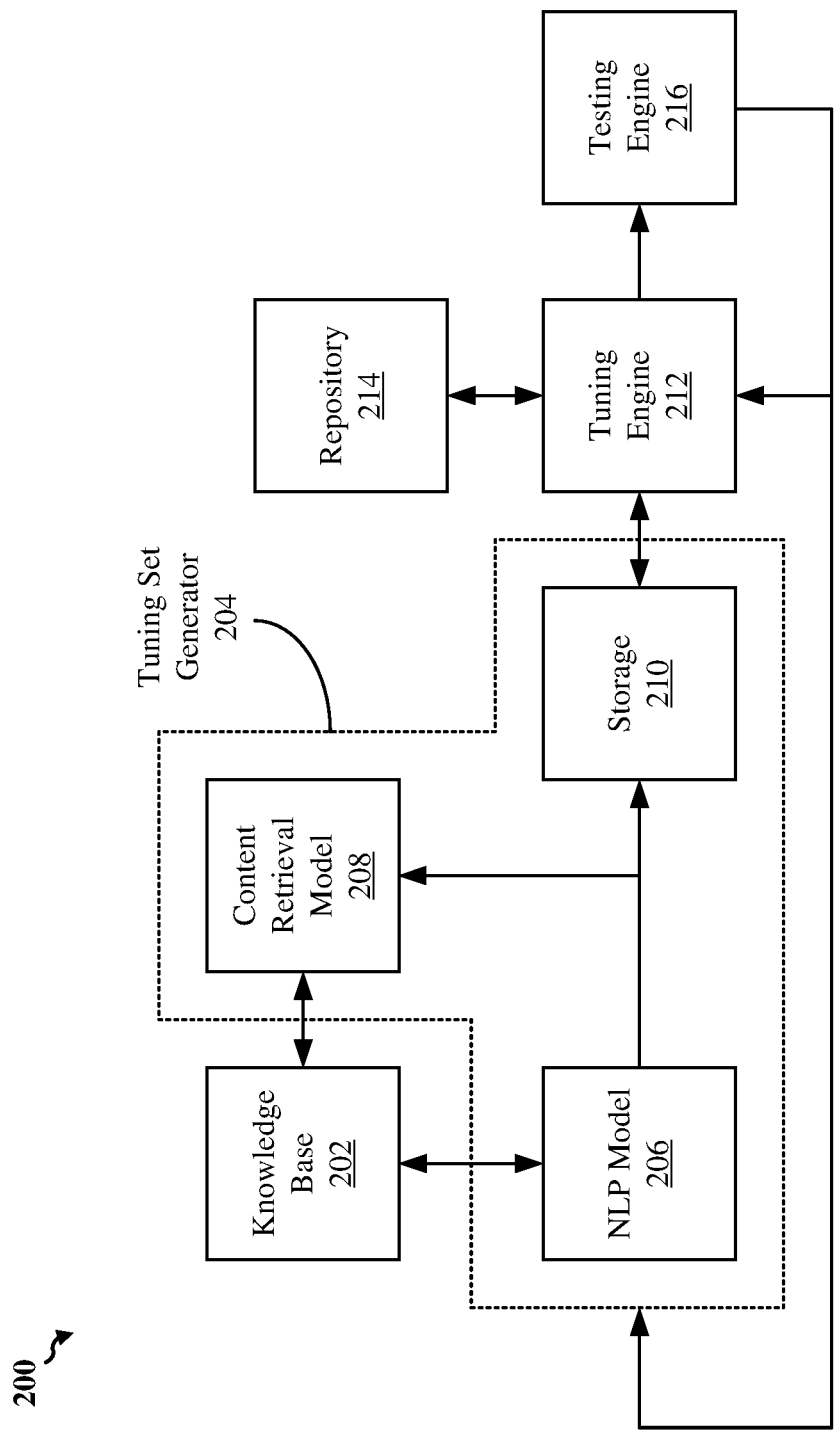
FIG. 2 shows an example block diagram of components for tuning a generative AI model, according to some implementations.

FIG. 2 shows an example block diagram 200 of components for tuning a generative AI model, according to some implementations. In some implementations, the configuration of components in the diagram 200 is implemented in the system 100 depicted in FIG. 1. In such an implementation, the knowledge base 202 may be an example implementation of the knowledge base 160, the tuning set generator 204 may be an example implementation of the tuning set generator 150, the tuning engine 212 may be an example implementation of the tuning engine 170, the repository 214 may be an example implementation of a repository to store the one or more generative AI models 140, and the testing engine 216 may be an example implementation of the testing engine 180.

The knowledge base 202 stores the content (articles) used for tuning the generative AI model and thus grounding the model in specific subject matter. As noted above, a knowledge base may be searchable and accessed to retrieve articles stored in the knowledge base. For example, each article may be in hypertext markup language (HTML) format and include a meta tag indicating information regarding the article. A tokenizer and vectorizer may be used to identify the most used terms in order to generate the meta tag, or any other typical means to generate a meta tag may be used. A meta tag may also include other information regarding the article, such as date created, source, and so on. The information in the meta tags across articles may be accessed by a search engine to identify one or more articles based on a search query. The tuning set generator 204 may include one or more search engines to search the knowledge base 202.

As depicted in FIG. 2, the tuning set generator 204 includes a natural language processing (NLP) model 206, a content retrieval model 208, and a storage 210 to generate and store the tuning set to be used to tune the generative AI model by the tuning engine 212. The NLP model 206 is configured to generate questions from articles in the knowledge base 202 and generate answers to the generated questions. In some implementations, the NLP model 206 generates one question for each article retrieved from the knowledge base 202 by the NLP model 206. While not depicted in FIG. 2, the NLP model may include or be coupled to an article retrieval model separate from the content retrieval model 208 to retrieve the articles from the knowledge base 202 to be used to generate questions for the tuning set. In some implementations, every article is retrieved to generate a question. In some other implementations, only a subset of articles are retrieved, such as a subset of fixed size to manage the size of the tuning set used to tune the generative AI model. Selection of the articles to be retrieved may be performed in any suitable manner, such as randomly, sequentially, based on source of the article (such as whether generated by client service or in the user community), and so on. Generation of the question and answer for each retrieved article is described below with reference to FIG. 3.

The content retrieval model 208 is configured to search for and retrieve articles from the knowledge base 202 based on queries provided to the content retrieval model 208. For example, an existing digital assistant that provides only articles as resources to help a user in response to a question may include a content retrieval model to retrieve articles based on the question. The process of searching the knowledge base 202 by the content retrieval model may be similar to search engines, such as parsing the input queries and searching the meta tags of the articles based on the parsing to identify relevant articles and sort articles based on relevance. For the tuning set generator 204, the content retrieval model 208 receives a generated answer by the NLP model 206 for a generated question by the NLP model 206, parses the generated answer, searches for the most relevant article in the knowledge base 202, and retrieves the article (such as copying the text of the article or generating a link to the article as may be provided to the generative AI model for tuning). The most relevant article retrieved for an answer is the article linked to the question answer pair for the data point in the tuning set. The storage 210 is any suitable storage to store the tuning set. The storage 210 may be accessible and allow writes and rewrites in order to allow adjustment of the tuning set during tuning. Operation of a tuning set generator to generate the tuning set is described in more detail below with reference to FIG. 3.

Figure 3:
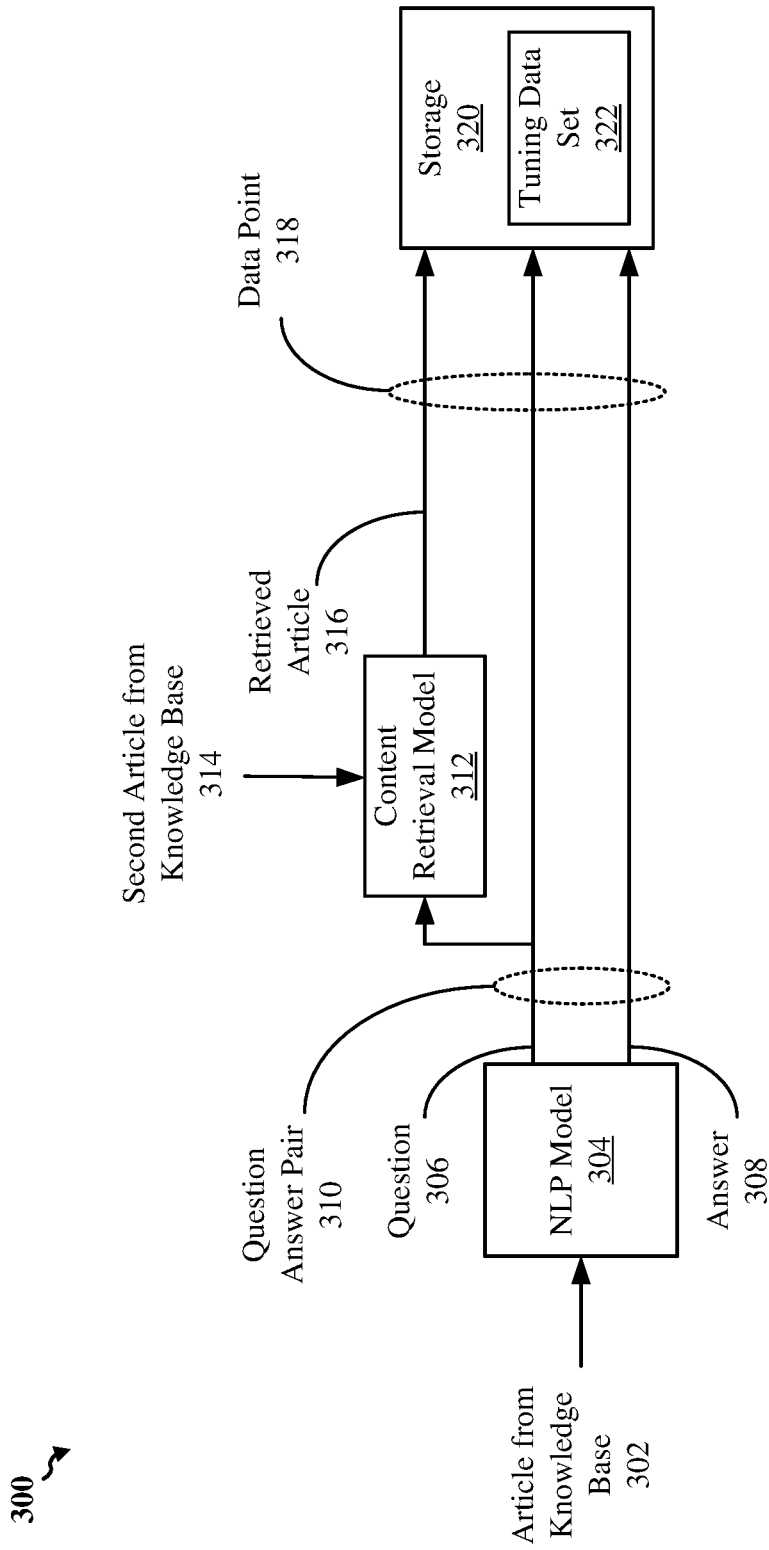
FIG. 3 shows an example block diagram for generating tuning data to tune a generative AI model, according to some implementations.

FIG. 3 shows an example block diagram 300 for generating tuning data to tune a generative AI model, according to some implementations. The tuning data includes tuning data points of a tuning set to be used for tuning a pretrained generative AI model. The block diagram 300 may be an example implementation of the tuning set generator 204 depicted in FIG. 2. For example, the NLP model 304 may be an example implementation of the NLP model 206, the content retrieval model 312 may be an example implementation of the content retrieval model 208, and the storage 320 including the tuning data set 322 may be an example implementation of the storage 210. FIG. 3 depicts generating one data point of the tuning set 322 for one article 302 from the knowledge base, but the described operations may be repeated any number of times to generate any number of data points for the tuning set 322. For example, the NLP model 304 may include or be coupled to a retrieval model to retrieve a defined number of articles, with the tuning set generator generating a defined number of data points for the defined number of articles. The defined number of articles may be hard coded by a developer or may be programmed as a variable to be input to the system 100 by a developer or user to allow indication of the tuning set size to be generated.

In some implementations, the NLP model 304 includes one or more NLP models to generate the questions and the answers of the tuning set. In some implementations, the NLP model 304 may include a first model to receive the article 302 from the knowledge base and generate a question based on the article, and the NLP model 304 may include a second model to receive the question generated by the first model and generate an answer based on the question. For example, the NLP model 304 may include a pretrained T5 model to perform text summarization on the article 302 to generate a natural language text summary. To note, a question to be answered may be an actual question or may be a phrase or summary. The T5 model may be configured to generate a general summary of an article or may be configured to generate the summary in the form of a question (such as a one sentence summarizing question regarding the article 302) to generate the question 306. The NLP model 304 may also include a pretrained third generation Generative Pre-training Transformer (GPT3) model to generate the answer 308 to the question 306 generated by the T5 model. The tuning set generator links the question and answer together as a question answer pair for the tuning data set 322. To note, while the T5 model and the GPT3 model as described as being used, any suitable large language model may be used to generate the question, and any suitable large language model may be used to generate the answer.

As noted above, a data point of the tuning data set 322 includes an article from the knowledge base linked to the question answer pair. The content retrieval model 312 is to retrieve the second article 314 from the knowledge base based on the question 306, with the retrieved article 316 (such as a link to the article or text of the article) being linked to the question answer pair 310 for the data point 318 of the tuning data set 322. As noted above, the content retrieval model may be configured similar to a search engine to parse the question 306 as an input query and search the knowledge base based on the query to find the most relevant article 314. The most relevant article is referred to as a second article for clarity to prevent confusion with the article provided to the NLP model 304. As noted above, the content retrieval model 312 may be the same model used to retrieve articles for a digital assistant.

To note, the article 302 may or may not be the same as article 314. For example, variations in the question 306 generated by a T5 model from the article 302 may cause the content retrieval model 312 to identify a different article as most relevant based on the variations. In another example, a different article than article 302 used to generate a question may be more relevant to answering the question (such as including more complete information for answering the question). As such, at least some data points of the tuning data set 322 may be associated with different articles 302 and 314. However, for at least some data points, article 302 input to the NLP model may be the same as article 314 retrieved by the content retrieval model 312.

Each data point 318 each provided to the storage 320 and stored in the tuning data set 322. As noted above, the storage 320 may be any suitable storage to store the tuning data set 322. For example, the storage 320 may be part of the database 120 or the memory 135. However, the storage 320 may be any other suitable storage of the system 100.

Referring back to FIG. 2, with the tuning set generated by the tuning set generator 204 and stored in storage 210, the tuning engine 212 is to tune a pretrained generative AI model using the tuning set. As depicted in FIG. 2, a repository 214 may store a plurality of generative AI models that may be tuned. Before tuning the pretrained generative AI model, the tuning engine 212 may be configured to select the pretrained generative AI model from the repository 214 (such as described above). The selected generative AI model may thus be retrieved from the repository 214 for the tuning engine 212 to train the selected generative AI model using the tuning set stored in storage 210. Tuning the pretrained generative AI model may be as described above, such as iteratively adjusting hyperparameters of the generative AI model to reduce a cost function between the answers of the tuning set and the answers generated by the generative AI model, adjusting the knowledge base to remove portions of the knowledge base found to be unhelpful (such as causing outlier data points in the tuning set), or adjusting the tuning set (such as removing or replacing outlier data points or regenerating data points for one or more articles). As noted above, tuning may be based on one or more of objective metrics (such as BLEU scores or BERT scores) or subjective metrics (such as the user feedback described above, including feedback regarding accuracy, completeness, and appropriateness of answers).

The testing engine 216 is to test the generative AI model. The testing engine 216 may also be used to test the tuning set. As noted above, the testing engine 216 may be configured to generate the objective metrics and/or the subjective metrics, with such metrics being used, e.g., in a cost function to adjust the generative AI model itself in the tuning engine 212, to identify and remove outliers in the tuning set stored in the storage 210, or to adjust the NLP model (such as a T5 model) to generate questions to the articles provided to the NLP model 206. As such, the testing engine 216 is depicted having a feedback to the tuning engine 212 and the tuning set generator 204 for tuning. As noted above, the testing engine 216 may alternatively be configured to test the generative AI model after tuning. Additional details regarding the testing engine 216 are described in more detail below with reference to FIG. 5.

Figure 4:
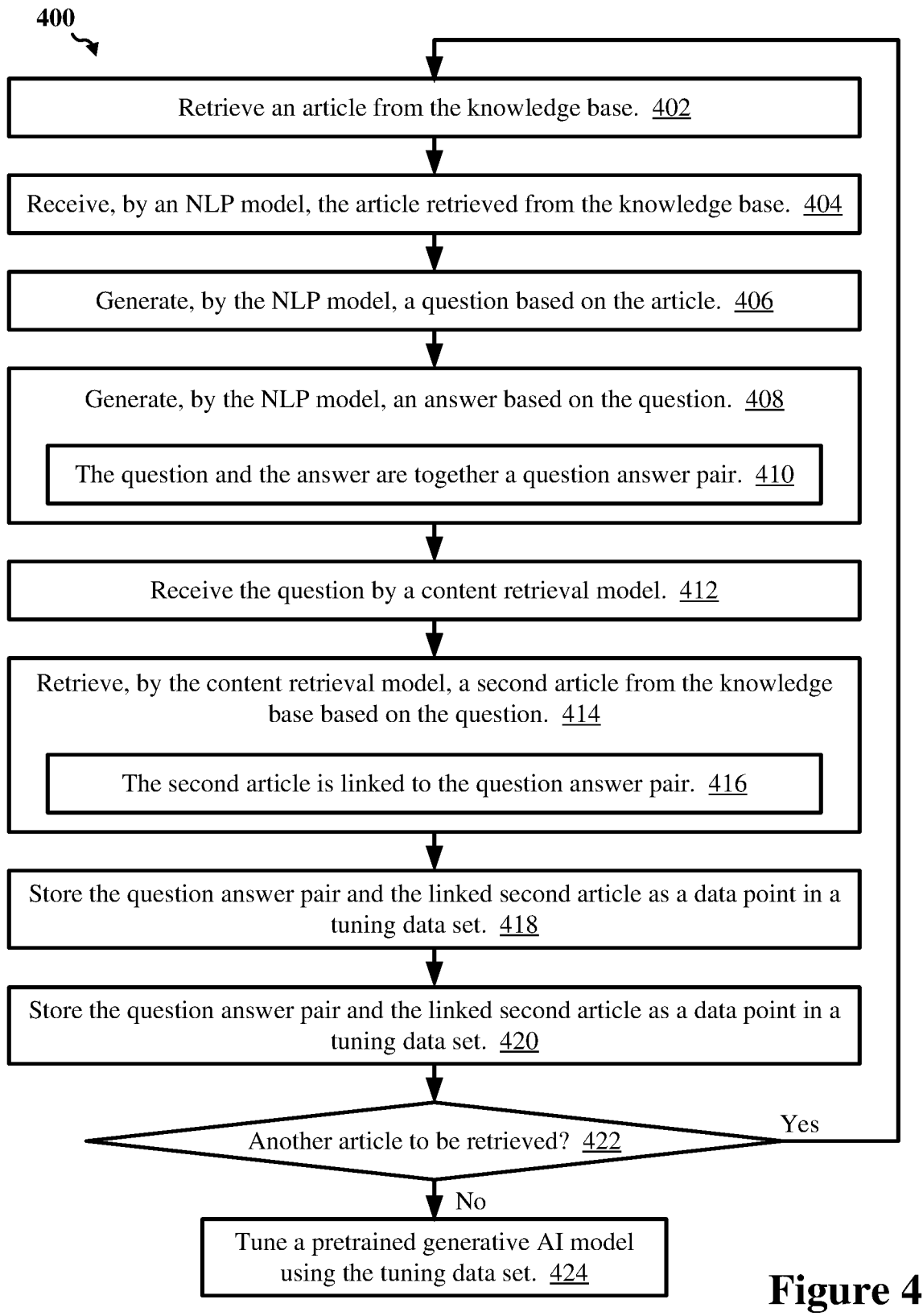
FIG. 4 shows an illustrative flow chart depicting an example operation for tuning a generative AI model, according to some implementations.

FIG. 4 shows an illustrative flow chart depicting an example operation 400 for tuning a generative AI model, according to some implementations. The example operation 400 is described as being performed by the system 100, which may include the configuration of components depicted in FIG. 2 and the configuration of tuning set generator components depicted in FIG. 3. The example operation 400 is described below as being performed by the system 100 depicted in FIG. 1 with reference to the components depicted in FIGS. 2 and 3 for clarity. Blocks 402-422 of operation 400 are directed to the generation of a tuning set for tuning a pretrained generative AI model in block 424. Blocks 402-420 of operation 400 may be performed a defined number of times for a defined number of data points to be included in the tuning set.

At 402, the system 100 retrieves an article from the knowledge base 160. For example, a retrieval model coupled to the NLP model of the tuning set generator may retrieve a defined number of articles from the knowledge base 160, with each article being provided to the NLP model to generate a data point of the tuning set (also referred to as a tuning data set). At 404, the NLP model receives the article retrieved from the knowledge base. For example, the coupled retrieval model may output the text of the article to a large language model configured to generate a question.

At 406, the NLP model generates a question based on the article. For example, a T5 model of the NLP model 304 may generate question 306 by summarizing article 302. At 408, the NLP model also generates an answer based on the question generated by the NLP model. For example, a GPT3 model of the NLP model 304 may receive the question 306 generated by the T5 model as an input and generate the answer 308. The question and the answer are together a question answer pair (410). The system 100 may thus link the question 306 and answer 308 as a question answer pair 310 (with the answer 308 being a label for supervised learning and the question 306 being input data to the generative AI model to be tuned).

At 412, a content retrieval model receives the question generated by the NLP model. For example, the T5 model of the NLP model 304 outputs the question 306, with the question 306 being routed as an input to the content retrieval model 312. At 414, the content retrieval model retrieves a second article from the knowledge base based on the question. For example, the content retrieval model 312 may be configured similar to a search engine to parse the question 306 and search the knowledge base to identify the most relevant article 314. With the most relevant article identified, the content retrieval model 312 retrieves the article 314 and outputs the article. The second article (such as retrieved article 316 output by the content retrieval model 312) is linked to the question answer pair (416). As described above, the question answer pair and the linked second article together is a data point of the tuning set.

At 418, the system 100 stores the question answer pair and the linked second article as a data point in a tuning data set. For example, the data point 318 including the linked article 316 (which is retrieved based on the question 306) and the question answer pair 310 is stored in the storage 320 as part of the tuning data set 322. At decision block 422, if another article is to be retrieved from the knowledge base to create another data point of the tuning set, the process reverts to block 402, and another article is retrieved from the knowledge base in order to generate another data point. For example, if a defined number of data points have not yet been generated for the tuning set, the system 100 may again perform blocks 402-420 to generate and store another data point in the tuning set. Referring back to decision block 422, if another article is not to be retrieved (such as the tuning set having a defined number of data points or all articles having already been retrieved from the knowledge base), the process proceeds to block 424.

At 424, the system 100 tunes a pretrained generative AI model using the tuning data set. Tuning the generative AI model by the system 100 (such as by the tuning engine 212) may include, for each data point in the tuning set, providing the question and the second article as inputs to the pretrained generative AI model. The question is provided as an input for which the model is to generate an answer, and the second article linked to the question is provided as a context input to shape the answer generated by the model, thus grounding the model. The pretrained generative AI model generates a second answer based on the question and the second article (with the answer of the data point being the first question). The system 100 may thus generate a cost based on comparing the answer (from the data point) and the second answer from the generative AI model. For example, the answer and the second answer may be tokenized and vectorized to generate two vectors, and the system 100 may calculate a distance between the two vectors as a cost. The tuning engine 212 and/or the testing engine 216 may be configured to generate a cost. For the one or more costs associated with the one or more second answers, the system 100 tunes the pretrained generative AI model to reduce the one or more costs. For example, with a second answer generated for each question and a cost generated for each second answer, the system 100 may generate a cost function (such as a weighted or simple average of the costs). The system 100 tunes the pretrained generative AI model to reduce the cost function. As noted above, tuning the generative AI model includes adjusting the hyperparameters of the generative AI model. Tuning may also include adjusting the tuning set or the knowledge base, such as described above.

In some implementations, each of the one or more costs is associated with one or more objective testing metric values. For example, the one or more objective testing metric values may be based on one or more of a BLEU score or a BERT score. For the one or more costs being associated with one or more objective testing metric values, reducing the one or more costs includes improving the one or more objective testing values (such as overall increasing the BLEU scores or BERT scores).

In addition to tuning the generative AI model based on one or more objective testing metric values, tuning the generative AI model may be based on one or more subjective testing metric values. In some implementations, the one or more second answers generated by the generative AI model are provided to one or more users acting as evaluators of the answers. For example, the users may access a sandbox or playground implemented by the system 100 that allows interacting with the generative AI model being tuned (or after tuning). A user may see a digital assistant interface that displays the question answered by the generative AI model and the second answer generated by the generative AI model. After providing the question and answer to the one or more users, the system 100 receives user feedback from the one more users regarding the second answer. For example, each user may read the second answer and evaluate how well the second answer responds to the question. For example, the system 100 may display three inputs for the user to provide, a first input regarding the accuracy of the second answer in answering the question, a second input regarding the completeness of the second answer in answering the question, and a third input regarding the content of the second answer being appropriate (such as not including profanity, toxic language, and so on). In some implementations, buttons for 1, 2, and 3 are displayed to the user for each of the three inputs, with the user to select the button corresponding to the user's opinion regarding the second answer (such as the accuracy, the completeness, and the appropriateness of the second answer). In some implementations, the system 100 may tune the pretrained generative AI model based on the user feedback. For example, the scores from 1 to 3 may be averaged for each of the accuracy, the completeness, and the appropriateness across all of the users to generate an average accuracy score, an average completeness score, and an average appropriateness score. Those scores may be used to tune the generative AI model, such as being incorporated in the cost function so that the average scores increase as the model is trained. As noted above, the scores may also be used to adjust the tuning set or to adjust the knowledge base.

While not depicted in FIG. 4, in some implementations, the question answer pairs in the tuning set may be evaluated before tuning a generative AI model. For example, a developer may wish to spot check as to whether the NLP model is performing sufficiently in generating questions and answers. As such, at least a portion of the one or more question answer pairs of the tuning set may be reviewed (such as by a person or a team of persons), and the one or more question answer pairs may be adjusted based on the review before tuning the pretrained generative AI model. For example, a developer may determine that a question is irrelevant or that an answer does not sufficiently answer the question. In response, the developer may, e.g., remove the data point including the question answer pair from the tuning set, adjust the question and have a new answer generated by the NLP model and a new second article retrieved for the data point, or adjust the answer to the question.

In addition, while not depicted in FIG. 4, in some implementations, a pretrained generative AI model may be selected from a plurality of generative AI models that may be tuned. For example, the system 100 stores a plurality of generative AI models in a repository. In order to tune a pretrained generative AI model, the system 100 selects the pretrained generative AI model from the plurality of generative AI models (such as described above) and retrieves the pretrained generative AI model for tuning. In some implementations, the system 100 retrieves all of the models in the repository and tunes all of the models using the tuning set. In this manner, the corresponding answers of the tuned models can be compared to one another to determine the model for use. For example, the model having the lowest cost function after tuning may be selected by the system 100 for use by one or more end users. In this manner, any suitable generative AI model may be loaded into the repository, and the system 100 to tune a generative AI model may be agnostic to the type of model to be trained. Alternatively, the generative AI model to be tuned may be defined. In some implementations, the generative AI model that is tuned by the system is the BART model.

Operation 400 may be repeated as desired. For example, the knowledge base may grow as additional articles are generated regarding a topic. Once the knowledge base grows a defined amount or over a defined amount of time, the system 100 may be triggered to perform operation 400 using the updated knowledge base. In another example, a metric of an increase in the number or percentage of escalations from an AI chatbot type digital assistant using the tuned generative AI model to a human support specialist (indicating that the digital assistant may not be as helpful as before) may be measured. If the metric reaches a threshold, the system 100 may be retriggered to perform operation 400 using an adjusted knowledge base.

As noted above, testing of the generative AI model may be performed during tuning of the model or after tuning of the model in order to evaluate the performance of the model. The testing engine 180 of the system 100 may implement the framework in which the generative AI model is evaluated. Testing the generative AI model may include generating one or more of objective testing metrics or subjective testing metrics.

Figure 5:
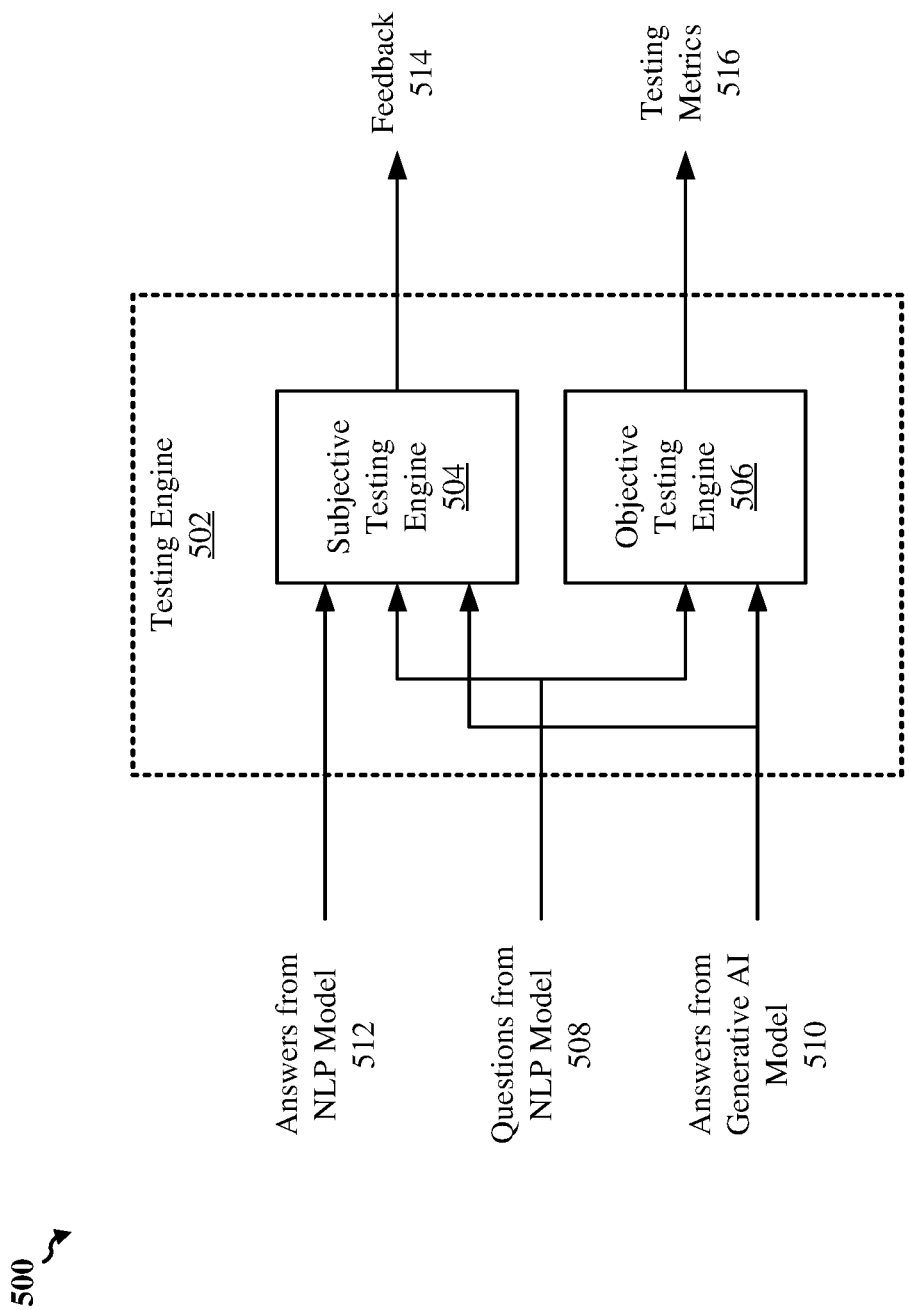
FIG. 5 shows an example block diagram for testing a generative AI model, according to some implementations.

FIG. 5 shows an example block diagram 500 for testing a generative AI model, according to some implementations. The testing engine 502 depicted in FIG. 5 is an example implementation of the testing engine 216 depicted in FIG. 2. The testing engine 502 is depicted as outputting feedback 514 (such as subjective testing metrics described above) and testing metrics 516 (such as objective testing metrics described above) based on one or more of the question 508 generated by the NLP model for the tuning set, the answers 510 generated by the generative AI model in response to the questions 508, or the answer 512 generated by the NLP model in response to the questions 508 for the tuning data set (i.e., the answers from the question answer pairs of the data points of the tuning sets).

The testing engine 502 includes a subjective testing engine 504 to generate the feedback 514 and the objective testing engine 506 to generate the testing metrics. Referring first to the objective testing engine 506, the objective testing engine 506 is configured to receive the questions 508 from the NLP model of the tuning set generator and the answers 510 from the generative AI model, with the answers 510 generated in response to the questions 508. For example, the objective testing engine 506 receives a first question 508 generated for a first article by the NLP model and a first answer 510 generated by the generative AI model in response to the first question 508 received by the generative AI model, a second question 508 generated for a second article and a second answer 510 generated in response to the second question 508, and so on for each data point of the tuning set. For each pair of question 508 and answer 510, the objective testing engine 506 is configured to generate one or more metrics 516. For example, the engine 506 may implement an algorithm to generate a first BLEU score and/or a first BERT score for a first pair of question 508 and answer 510, to generate a second BLEU score and/or a second BERT score for a second pair, and so on for each pair of question and answer provided to the engine 506. As noted above, the scores may be used to evaluate the generative AI model after tuning (such as allowing the tuned generative AI model to be released for use if the average score across the pairs of questions 508 and answer 510 meet a defined threshold). Additionally or alternatively, the scores may be used for tuning (such as incorporating the scores into a cost function used for tuning the generative AI model).

Referring to the subjective testing engine 504, the subjective testing engine 504 may be configured to obtain feedback 514 from one or more users (such as from a pool of testers evaluating outputs of the generative AI model or inputs to the generative AI model). The subjective testing engine 504 receives the questions 508 and the answers 510, and, in some implementations, the subjective testing engine 504 may also receive the answers 512 from the NLP model (i.e., the answers of the question answer pairs of the tuning set for the questions 508). The engine 504 is configured to provide the sandbox or playground for use by the one or more users to evaluate the generative AI model. For example, as described above, a user may be provided the question 508 and the answer 510 in order to provide user feedback as to the accuracy, completeness, and appropriateness of the answer (such as described above). In some implementations, a user may also input his or her own question for the generative AI model and receive the answer from the generative AI model through the sandbox in order for the user to provide feedback as to the answer. The user may also provide a desired answer as feedback, and the question provided by the user and the answer provided by the user may be used as a question answer pair in the tuning set.

Referring back to the accuracy, completeness, and appropriateness metrics, the metrics may be numerical measures (such as integers from 1 to 3) averaged (or otherwise combined) across users in the sandbox for each question. Additionally or alternatively, the metrics may be averaged (or otherwise combined) across questions for the generative AI model. In this manner, a total accuracy metric, completeness metric, and appropriateness metric may be generated for a generative AI model or may be generated at the question level for the generative AI model. Similar to the objective metrics 516, the subjective metrics (the feedback 514) may be used for tuning or for evaluation of the generative AI model after tuning. For example, the tuned generative AI model may be released for use if the average score for each of the accuracy metric, completeness metric, and appropriateness metric meet a defined threshold). Additionally or alternatively, the accuracy metric, completeness metric, and appropriateness metric may be incorporated into a cost function used for tuning the generative AI model. As noted above, while the testing engine is depicted separated from the tuning engine in system 100, operations of the tuning engine and the testing engine may be intertwined.

As described herein, a system 100 may be implemented to tune a pretrained generative AI model, including automatically generating the tuning data set used to tune the generative AI model. In addition, a system 100 may be implemented to test the generative AI model, which may be used for tuning or evaluation after tuning. Such implementations allow for reducing the time and resources required to tune a generative AI model, as well as improve the performance of the tuned generative AI model.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for tuning a generative artificial intelligence (AI) model, the method comprising:
   for each article of one or more articles stored in a knowledge base:
      retrieving the article from the knowledge base;
      receiving, by a natural language processing (NLP) model, the article retrieved from the knowledge base;
      generating, by the NLP model, a question based on the article;
      generating, by the NLP model, an answer based on the question, wherein the question and the answer are together a question answer pair;
      receiving the question by a content retrieval model;
      retrieving, by the content retrieval model, a second article from the knowledge base based on the question, wherein the second article is linked to the question answer pair; and
      storing the question answer pair and the linked second article as a data point in a tuning data set; and
   tuning a pretrained generative AI model using the tuning data set.

2. The method of claim 1, further comprising:
   storing a plurality of generative AI models in a repository, wherein the plurality of generative AI models includes the pretrained generative AI model;
   selecting the pretrained generative AI model from the plurality of generative AI models; and
   retrieving the pretrained generative AI model from the repository for tuning.

3. The method of claim 1, wherein tuning the pretrained generative AI model includes:
   for each article of the one or more articles stored in the knowledge base:
      providing the question and the second article as inputs to the pretrained generative AI model;
      generating a second answer by the pretrained generative AI model based on the question and the second article; and
      generating a cost based on comparing the answer and the second answer; and
   tuning the pretrained generative AI model to reduce the one or more costs.

4. The method of claim 3, wherein:
   each of the one or more costs is associated with one or more objective testing metric values; and
   reducing the one or more costs includes improving the one or more objective testing metric values.

5. The method of claim 4, wherein the one or more objective testing metric values are based on one or more of:
   a Bilingual Evaluation Understudy (BLEU) score; or
   a Bidirectional Encoder Representations from Transformers (BERT) score.

6. The method of claim 1, wherein tuning the pretrained generative AI model includes:
   for each article of the one or more articles stored in the knowledge base:
      providing the question and the second article as inputs to the pretrained generative AI model; and
      generating a second answer by the pretrained generative AI model based on the question and the second article;
   providing one of the one or more second answers to one or more users;
   receiving user feedback from the one or more users regarding the second answer; and
   tuning the pretrained generative AI model based on the user feedback.

7. The method of claim 6, wherein the user feedback includes feedback regarding one or more of:
   an accuracy of the second answer;
   a completeness of the second answer; or
   an appropriateness of the second answer.

8. The method of claim 1, wherein the pretrained generative AI model is a Bidirectional Autoregressive Transformer (BART) model.

9. The method of claim 1, wherein the NLP model includes one or more of:
   a Text-To-Text Transfer Transformer (T5) model; or
   a third generation generative pre-trained transformer (GPT3) model.

10. The method of claim 9, further comprising:
    reviewing at least a portion of the one or more question answer pairs; and
    adjusting the one or more questions answer pairs based on the review before tuning the pretrained generative AI model.

11. A system for tuning a generative artificial intelligence (AI) model, the system comprising:
    a knowledge base to store one or more articles;
    one or more processors; and
    a memory storing instructions that, when executed by the one or more processors, causes the system to perform operations comprising:

for each article of the one or more articles stored in the knowledge base:
  retrieving the article from the knowledge base;
  receiving, by a natural language processing (NLP) model, the article retrieved from the knowledge base;
  generating, by the NLP model, a question based on the article;
  generating, by the NLP model, an answer based on the question, wherein the question and the answer are together a question answer pair;
  receiving the question by a content retrieval model;
  retrieving, by the content retrieval model, a second article from the knowledge base based on the question, wherein the second article is linked to the question answer pair; and
  storing the question answer pair and the linked second article as a data point in a tuning data set; and
tuning a pretrained generative AI model using the tuning data set.

12. The system of claim 11, further comprising a repository, wherein the operations further comprise:
  storing a plurality of generative AI models in the repository, wherein the plurality of generative AI models includes the pretrained generative AI model;
  selecting the pretrained generative AI model from the plurality of generative AI models; and
  retrieving the pretrained generative AI model from the repository for tuning.

13. The system of claim 11, wherein tuning the pretrained generative AI model includes:
  for each article of the one or more articles stored in the knowledge base:
    providing the question and the second article as inputs to the pretrained generative AI model;
    generating a second answer by the pretrained generative AI model based on the question and the second article; and
    generating a cost based on comparing the answer and the second answer; and
  tuning the pretrained generative AI model to reduce the one or more costs.

14. The system of claim 13, wherein:
  each of the one or more costs is associated with one or more objective testing metric values; and
  reducing the one or more costs includes improving the one or more objective testing metric values.

15. The system of claim 14, wherein the one or more objective testing metric values are based on one or more of:
  a Bilingual Evaluation Understudy (BLEU) score; or
  a Bidirectional Encoder Representations from Transformers (BERT) score.

16. The system of claim 11, wherein tuning the pretrained generative AI model includes:
  for each article of the one or more articles stored in the knowledge base:
    providing the question and the second article as inputs to the pretrained generative AI model; and
    generating a second answer by the pretrained generative AI model based on the question and the second article;
  providing one of the one or more second answers to one or more users;
  receiving user feedback from the one or more users regarding the second answer; and
  tuning the pretrained generative AI model based on the user feedback.

17. The system of claim 16, wherein the user feedback includes feedback regarding one or more of:
  an accuracy of the second answer;
  a completeness of the second answer; or
  an appropriateness of the second answer.

18. The system of claim 11, wherein the pretrained generative AI model is a Bidirectional Autoregressive Transformer (BART) model.

19. The system of claim 11, wherein the NLP model includes one or more of:
  a Text-To-Text Transfer Transformer (T5) model; or
  a third generation generative pre-trained transformer (GPT3) model.

20. The system of claim 19, further comprising:
  reviewing at least a portion of the one or more question answer pairs; and
  adjusting the one or more questions answer pairs based on the review before tuning the pretrained generative AI model.

* * * * *